Jan. 11, 1955

H. TROEGER ET AL
QUICK DISCONNECT MOUNTING 2,699,343

Filed Dec. 20, 1950

INVENTORS
HENRY TROEGER
RAYMOND D. PALFREYMAN
BY

ATTORNEY

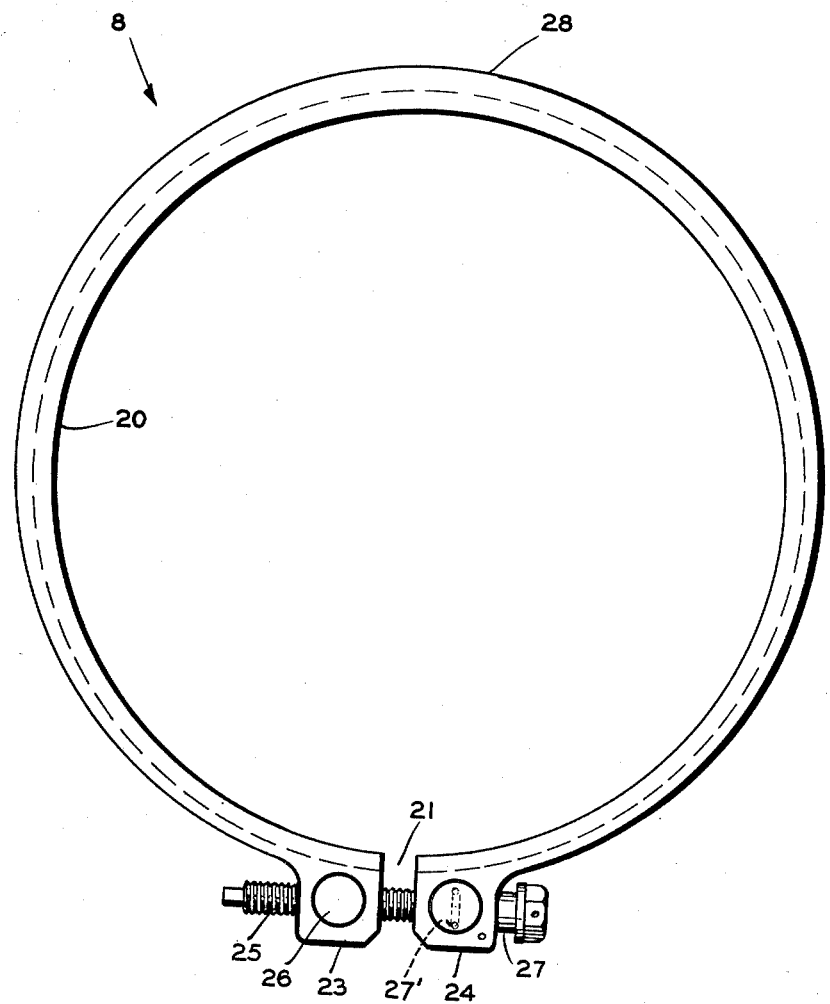

United States Patent Office 2,699,343
Patented Jan. 11, 1955

2,699,343

QUICK DISCONNECT MOUNTING

Henry Troeger, Ramsey, and Raymond D. Palfreyman, Clifton, N. J., assignors to Bendix Aviation Corporation, Teterboro, N. J., a corporation of Delaware Application December 20, 1950, Serial No. 201,764

1 Claim. (Cl. 285—129)

The present invention relates to quick detachable means, such as mountings for accessories, and particularly to quick detachable means for mounting aircraft engine accessories.

Aircraft engines may have several accessories or parts detachable therefrom, such as engine starter, generator, fuel pump to mention a few, and adapted to be drivably connected to the engine. In operation, it is desirable that the accessories may be individually and rapidly replaceable. Thus, it is desirable to have some means to provide for quick detachable mounting so that, upon failure of one accessory, the craft may not be incapacitated for an undue length of time.

By reason of the high frequency vibration of the engine, lack of space, weight restrictions, and other factors, the provision of an effective quick detachable mount has presented difficult problems. One of the outstanding problems is the inability of the parts to remain tight under engine vibrations for any appreciable length of time.

The present invention is directed to a quick disconnect mount wherein a resilient circular channeled member split at the periphery to permit its expansion to a larger diameter, is utilized to force together two flanges. One of the flanges is secured to the engine housing and the other to the accessory. The resilient channeled member, due to its own resiliency maintains a clamping action at all times.

An object of the invention is to provide improved quick disconnect mounting means for engine accessories.

Another object of the invention is to provide quick detachable means which are simple and durable in construction, economical to manufacture and effective in its operation.

Another object of the invention is to provide a clamp ring for a quick detachable unit that is primarily stressed to maintain a clamping action.

Another object of the invention is to provide means for quickly attaching an accessory to an engine.

The above and other objects and features of the invention will appear more fully hereinafter from a consideration of the following description taken in connection with the accompanying drawings wherein one embodiment of the invention is illustrated by way of example.

In the drawings:

Figure 2 is an end view of the clamp ring.

Figure 1:
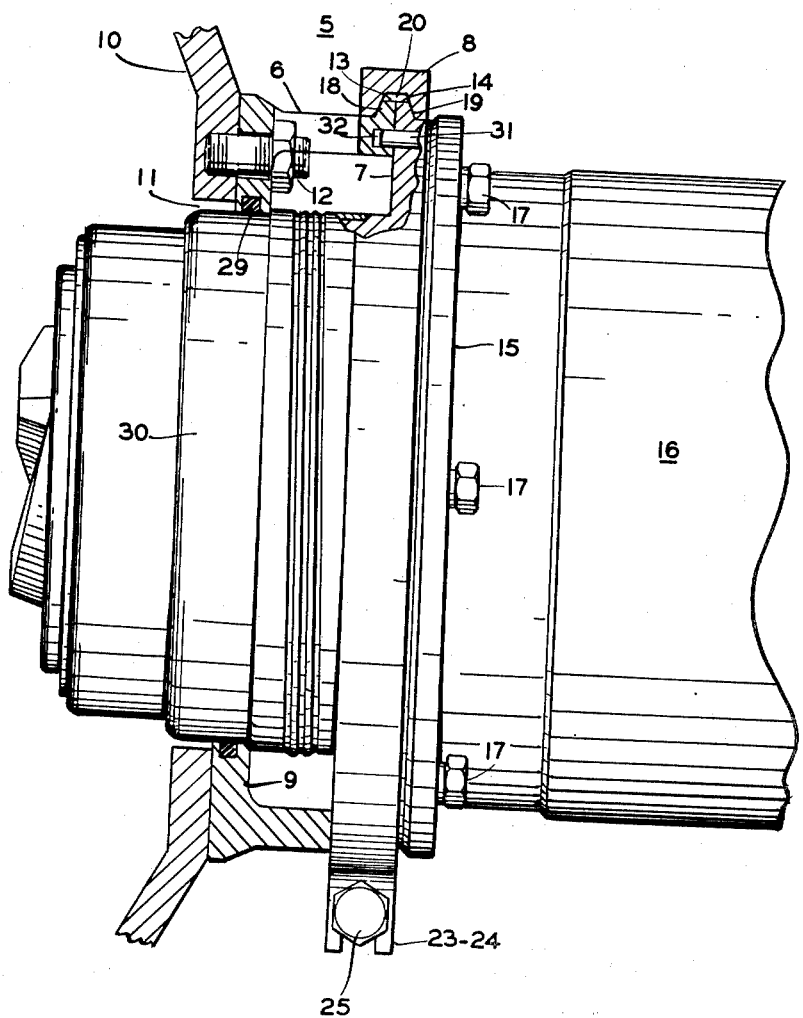
Figure 1 is a partially cutaway side elevation view of an accessory mounted on an engine illustrating one embodiment of the invention.

Referring now to the drawings, a quick detachable engine accessory mount indicated generally by the numeral 5 comprises an engine adaptor member 6, an accessory adaptor member 7 and a clamp ring 8.

The member 6 has a circumferential flange 9 adapted to be secured to an engine case 10 around an opening 11 by studs 12. The opposite end of the member 6 has an outward extending circumferential flange member 13 and is adapted to abut with a circumferential flange 14 of the member 7. The member 7 is secured to housing 15 of an accessory indicated generally by the numeral 16 by studs 17. It is understood, however, that the member 7 may be integral with the housing 15. The flanges 13 and 14 are provided with chamfers or bevel margins 18 and 19 at the axially remote sides thereof.

The clamping ring 8, see Figure 2, has an inwardly opening channel section 20 and is split at the periphery 21 to permit its expansion to a larger diameter. Lugs 23 and 24 are provided at the ends formed by the split 21. A screw 25 is provided for expanding the ring 8. One of the lugs has a threaded insert 26 and the other is adapted to hold a collar 27 pinned to the screw 25 by a tangential pin 27' fitting a circumferential groove in the screw 25. The ring 8 has its outer edge eccentric to the inner edge to render the ring body radially wider at a portion 28 diametrically opposite the split 21 and progressively decreasing to provide a more uniform stress distribution in the ring 8 when expanded. The free diametrical dimensions of the ring 8 are somewhat smaller than those in the installed position thus providing the ring 8 with a resilient bias inwardly.

The channel 20 of the ring has sloping sides adapted to coact with the chamfers 18 and 19 to bias the flanges 13 and 14 tightly together when the screw 25 is tightened sufficiently to cause the channel section 20 to wedge the flanges 13 and 14 together.

The flange 9 is provided with a seal ring 29 adapted to cooperate with a housing portion 30 of the accessory 16 extending into the opening 11 of the engine case 10 to form a seal therebetween.

In order to relieve the ring 8 of torque, pins 31 secured to the member 14 and adapted to be positioned in a hole 32 in the member 13 are provided. The number of pins 31 and mating holes 32 required will depend upon the type of accessory to be mounted.

In operation, the member 6 is secured to the engine housing 10 and the member 7 to the accessory 16. The ring 8 is expanded sufficiently to permit it being slipped over the flange 13 and rested on the member 6. The accessory 16 is then inserted in the hole 11 of the engine housing into engagement with an engine member (not shown). The ring 8 is then placed in position over the flanges 13 and 14 and tightened until the channel 20 coacts with the chamfers 18 and 19 to wedge the flanges 13 and 14 together. The pins 31 prevent the accessory 16 from turning in the mount due to torque. The ring 8 due to its own resiliency tends to maintain the clamping action and does not depend upon the screw 25 to provide all the clamping action. Further, in case the screw 25 should break or loosen, the resiliency of the ring 8 would still maintain the clamping action.

To remove the accessory 16, the screw 25 is turned in a direction to spread the ring 8 to permit it to be slipped over the flanges 13 and 14 and onto the member 6 behind the flange 13. The accessory 16 is then free to be removed.

Although only one embodiment of the invention has been illustrated and described, various changes in the form and relative arrangement of the parts, which will now appear to those skilled in the art, may be made without departing from the scope of the invention.

What is claimed:

A clamping device useful in aircraft for clamping a driven accessory to the driving engine, comprising an open ended hoop spring strip, rectangular in cross section and including a flat bottomed channel about its inner face, the arms of the channel converging outward at a slight angle, the outer diameter of the hoop being eccentric to the inner diameter thereof to provide a thickened hoop portion diametrically opposite to the open ended portions, the free ends of the hoop resiliently biased toward each other and adapted to spread apart to encompass opposed flange members of the accessory and engine, which flange members together form a rib complementary in form to the channel of the hoop, screw means engageable with threaded means at the free ends of the hoop for spreading the free ends of the hoop apart against the inward bias thereof when turned in one direction so as to permit the opposed flanges to be received in the channel and when turned in the other direction for drawing the walls of the channel tightly about the flange members so as to wedge the latter tightly therein and secure against separating upon vibration of the engine, the hoop having its normal diametrical dimensions smaller than when in the clamped position, and the resilient inward bias of the free ends of the hoop being sufficient to hold the opposed flanges together in the channel.

(References on following page)

References Cited in the file of this patent

UNITED STATES PATENTS

| Number | Name | Date |
|---|---|---|
| 1,093,868 | Leighty | Apr. 21, 1914 |
| 1,185,487 | Eastman | May 30, 1916 |
| 1,882,616 | Hutchinson | Oct. 11, 1932 |
| 1,997,385 | Lodenkemper | Apr. 9, 1935 |
| 2,080,988 | Schulz | May 18, 1937 |
| 2,226,396 | Wackmann | Dec. 24, 1940 |
| 2,313,763 | Olsen | Mar. 16, 1943 |
| 2,353,572 | Kuster et al. | July 11, 1944 |
| 2,416,852 | Schaaff | Mar. 4, 1947 |
| 2,439,161 | Du Bois | Apr. 6, 1948 |
| 2,580,396 | Bluth | Jan. 1, 1952 |

FOREIGN PATENTS

| Number | Country | Date |
|---|---|---|
| 199,010 | Germany | June 5, 1908 |